(12) United States Patent
Kim et al.

(10) Patent No.: US 12,484,612 B2
(45) Date of Patent: Dec. 2, 2025

(54) TRIPLE CAPSULE, AND APPARATUS AND METHOD FOR MANUFACTURING SAME

(71) Applicant: KT&G CORPORATION, Daejeon (KR)

(72) Inventors: Ick Joong Kim, Daejeon (KR); Ho Rim Song, Daejeon (KR); Jae Gon Lee, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 818 days.

(21) Appl. No.: 17/255,251

(22) PCT Filed: Nov. 20, 2019

(86) PCT No.: PCT/KR2019/015920
§ 371 (c)(1),
(2) Date: Dec. 22, 2020

(87) PCT Pub. No.: WO2020/116827
PCT Pub. Date: Jun. 11, 2020

(65) Prior Publication Data
US 2021/0267270 A1    Sep. 2, 2021

(30) Foreign Application Priority Data

Dec. 4, 2018 (KR) .......................... 10-2018-0154698

(51) Int. Cl.
*A24D 3/06* (2006.01)
*A24D 3/02* (2006.01)
(Continued)

(52) U.S. Cl.
CPC ........... *A24D 3/061* (2013.01); *A24D 3/0216* (2013.01); *B01J 13/04* (2013.01); *B01J 13/206* (2013.01)

(58) Field of Classification Search
CPC ....... A24D 3/0216; A24D 3/048; A24D 3/061
See application file for complete search history.

(56) References Cited

U.S. PATENT DOCUMENTS

| 5,385,737 A | 1/1995 | Shigeno et al. |
| 6,426,089 B1 | 7/2002 | Sunohara et al. |
| (Continued) |

FOREIGN PATENT DOCUMENTS

| CN | 101219361 A | 7/2008 |
| CN | 103492062 A | 1/2014 |
| (Continued) |

OTHER PUBLICATIONS

Huang et al, "A kind of three layers contain capsule with diuresis promoting function and preparation method thereof", 2017, machine translation relied upon for references (Year: 2017).*

(Continued)

*Primary Examiner* — Michael H. Wilson
*Assistant Examiner* — Stephanie Lynn Moore
(74) *Attorney, Agent, or Firm* — Sughrue Mion, PLLC

(57) ABSTRACT

A method of manufacturing a triple capsule includes supplying an interior material, an intermediate film material, and an exterior film material; discharging a triple molding body by receiving the interior material, the intermediate film material, and the exterior film material through a nozzle mount and performing coextrusion on the interior material, the intermediate film material, and the exterior film material through a triple nozzle in which a first nozzle discharging the interior material, a second nozzle discharging the intermediate film material, and a third nozzle discharging the exterior film material are arranged concentrically; and forming the triple capsule by circulating a coolant and cooling the triple molding body.

11 Claims, 7 Drawing Sheets

(51) Int. Cl.
  *B01J 13/04*   (2006.01)
  *B01J 13/20*   (2006.01)

(56) References Cited

U.S. PATENT DOCUMENTS

| | | | |
|---|---|---|---|
| 10,694,777 | B2 | 6/2020 | Kim et al. |
| 2006/0174901 | A1* | 8/2006 | Karles .................... A24D 3/061 |
| | | | 131/337 |
| 2012/0220514 | A1 | 8/2012 | Fernandes et al. |
| 2012/0220515 | A1 | 8/2012 | Fernandes et al. |
| 2013/0217609 | A1 | 8/2013 | Fernandes et al. |
| 2019/0008782 | A1 | 1/2019 | Nakano |
| 2020/0281257 | A1 | 9/2020 | Kim et al. |

FOREIGN PATENT DOCUMENTS

| | | | | |
|---|---|---|---|---|
| CN | 107361392 | A | * 11/2017 | .............. A23P 10/35 |
| CN | 107438371 | A | 12/2017 | |
| EP | 0867188 | A1 | 9/1998 | |
| EP | 2218445 | A1 | 8/2010 | |
| EP | 3053434 | A1 | 8/2016 | |
| JP | 51-8176 | A | 1/1976 | |
| JP | 6-79165 | A | 3/1994 | |
| JP | 7-053356 | A | 2/1995 | |
| JP | 2009-051748 | A | 3/2009 | |
| JP | 2016-074615 | A | 5/2016 | |
| JP | 2017-119650 | A | 7/2017 | |
| JP | 2018-509940 | A | 4/2018 | |
| KR | 10-0569488 | B1 | 4/2006 | |
| KR | 10-1562648 | B1 | 10/2015 | |
| KR | 10-2016-0116827 | A | 10/2016 | |
| KR | 10-1678775 | B1 | 11/2016 | |
| WO | 98/07443 | A1 | 2/1998 | |
| WO | 2012/116014 | A1 | 8/2012 | |

OTHER PUBLICATIONS

Data Base WPI, week 197610, Thomson Scientific, London, GB, AN 1976-17780X (1 page total).
Data Base WPI, week 199817, Thomson Scientific, London, GB, AN 1998-193214 (3 page total).
Extended European Search Report dated Feb. 4, 2022 from the European Patent Office in EP Application No. 19894264.1.
Office Action dated Feb. 9, 2022 from the China National Intellectual Property Administration in CN Application No. 201980064584.X.
Partial supplementary European Search Report issued Nov. 4, 2021 in European Application No. 19894264.1.
Office Action issued Nov. 16, 2021 in Japanese Application No. 2020-557962.
Office Action issued Jul. 5, 2022 in Japanese Application No. 2020-557962.
International Search Report for PCT/KR2019/015920 dated Mar. 27, 2020 (PCT/ISA/210).

* cited by examiner

TRIPLE CAPSULE, AND APPARATUS AND METHOD FOR MANUFACTURING SAME

CROSS REFERENCE TO RELATED APPLICATIONS

This application is a National Stage of International Application No. PCT/KR2019/015920 filed Nov. 20, 2019, claiming priority based on Korean Patent Application No. 10-2018-0154698 filed Dec. 4, 2018.

TECHNICAL FIELD

The present disclosure relates to a triple capsule, an apparatus for manufacturing the same, and a method of manufacturing the triple capsule. More particularly, the present disclosure relates to an apparatus and a method of manufacturing a triple capsule by performing coextrusion on an exterior film material, an intermediate film material, and an interior material, and the triple capsule manufactured by the above apparatus and method.

BACKGROUND ART

Research is being conducted into a technology adding flavors to aerosol provided from cigarettes. For example, a method, in which a capsule carrying a flavor is arranged inside a filter configuring a cigarette such that a smoker may selectively add a flavor to aerosol according to the smoker's preference, and when the capsule is crushed by the smoker, the aerosol is flavored, is used.

Various flavoring materials may be carried in a capsule. For example, natural oil ingredients and fat-soluble flavoring materials such as fat-soluble vitamins or the like may be carried in an outer membrane of a soft capsule, and when the capsule is crushed by a smoker, aerosol may be flavored. However, excessively irritating flavors may be added to the aerosol due to the fat-soluble flavoring materials, which may adversely affect the smoking taste of cigarettes.

Various flavoring materials are needed to be carried in a capsule to add a softer flavor to aerosol provided from cigarettes. For example, flavors flavored by a capsule are needed to be various as water-soluble flavoring materials in addition to the fat-soluble flavoring materials are carried in the capsule.

A structure of a capsule carrying flavoring materials is needed to be improved to improve the smoking taste of cigarettes by carrying various flavoring materials in the capsule. In particular, a capsule manufacturing method that may accurately implement an improved capsule is needed.

DESCRIPTION OF EMBODIMENTS

Technical Problem

Provided are a triple capsule, an apparatus for manufacturing the same, and a method of manufacturing the triple capsule. In addition to the technical problems related to the triple capsule and the apparatus and method of manufacturing the same, other technical problems may be derived from the embodiments to be described hereinafter.

Technical Solution to Problem

According to an aspect of the present disclosure, a method of manufacturing a triple capsule includes supplying an interior material, an intermediate film material, and an exterior film material; discharging a triple molding body by receiving the interior material, the intermediate film material, and the exterior film material through a nozzle mount and performing coextrusion on the interior material, the intermediate film material, and the exterior film material through a triple nozzle in which a first nozzle discharging the interior material, a second nozzle discharging the intermediate film material, and a third nozzle discharging the exterior film material are arranged concentrically; and forming the triple capsule by circulating a coolant and cooling the triple molding body.

Advantageous Effects of Disclosure

A triple capsule including an exterior film material and an intermediate film material may be manufactured by a method and apparatus for manufacturing the triple capsule. When a fat-soluble material is included in an intermediate film material, an interior material including a water-soluble flavoring material may be carried in the triple capsule, and various flavors may be added to aerosol through the triple capsule.

The efficiency of manufacturing the triple capsule may be increased by the method and apparatus for manufacturing the triple capsule. The triple capsule may be rapidly manufactured as a coextrusion operation is performed on an exterior film material, the intermediate film material, and the interior material. In addition, an improved structure of the triple capsule may be accurately implemented by a nozzle structure of a molding unit that performs the coextrusion operation.

BEST MODE

Figure 1:
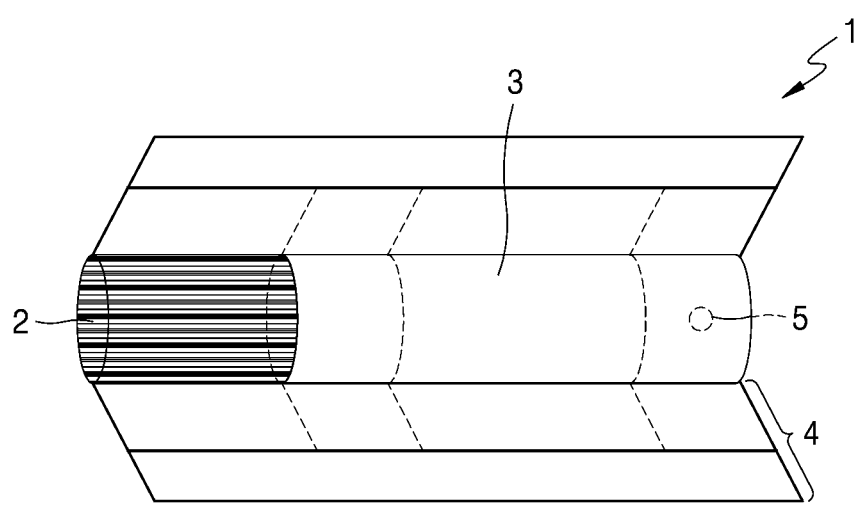
FIG. 1 is a diagram illustrating an embodiment of a cigarette including a triple capsule.

According to an aspect of the present disclosure, a method of manufacturing a triple capsule includes supplying an interior material, an intermediate film material, and an exterior film material; discharging a triple molding body by receiving the interior material, the intermediate film material, and the exterior film material through a nozzle mount and performing coextrusion on the interior material, the intermediate film material, and the exterior film material through a triple nozzle in which a first nozzle discharging the interior material, a second nozzle discharging the intermediate film material, and a third nozzle discharging the exterior film material are arranged concentrically; and forming the triple capsule by circulating a coolant and cooling the triple molding body.

According to another aspect of the present disclosure, an apparatus for manufacturing a triple capsule includes a material supply unit configured to supply an interior material, an intermediate film material, and an exterior film material; a molding unit comprising a nozzle mount receiving the interior material, the intermediate film material, and the exterior film material and a triple nozzle in which a first nozzle discharging the interior material, a second nozzle discharging the intermediate film material, and a third nozzle discharging the exterior film material are arranged concentrically, and discharging a triple molding body by performing coextrusion on the interior material, the intermediate film material, and the exterior film material; and a cooling unit forming the triple capsule by circulating a coolant and cooling the triple molding body.

According to another aspect of the present disclosure, a seamless capsule included in a cigarette includes an interior material including a water-soluble solvent and a water-soluble flavoring material and having a diameter of 2.5 mm or more and 6.0 mm or less; an intermediate film material including a fat-soluble wax and having a thickness of 0.1 mm or more and 1.0 mm or less; and an exterior film material including a water-soluble polymer material and having a thickness of 0.3 mm or more and 1.5 mm or less.

MODE OF DISCLOSURE

Hereinafter, example embodiments will be described in detail with reference to the drawings. It is to be understood that the following description is only for the purpose of embodying the embodiments and does not limit the scope of the present disclosure. Contents which can be easily derived by one of ordinary skill in the art should be construed as being included in the scope of the present disclosure.

In the present disclosure, it is to be understood that the term such as "configuring" or "including" is intended to indicate the existence of the various components or various operations disclosed in the present disclosure, some of the components or operations may be absent, and are not intended to preclude the possibility that additional components or operations may be added.

In the present disclosure, while such terms as "first," "second," etc., may be used to describe various components, such components must not be limited to the above terms. The above terms are used only to distinguish one component from another.

With respect to the terms in the present disclosure, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

The present embodiments relate to a triple capsule, an apparatus for manufacturing the same, and a method of manufacturing the triple capsule. Details that are well known to one of ordinary art to which the following embodiments pertain are omitted.

FIG. 1 is a diagram illustrating an embodiment of a cigarette including a triple capsule.

Referring to FIG. 1, a cigarette 1 may include a tobacco rod 2 and a filter rod 3. FIG. 1 illustrates that the filter rod 3 is configured in a single area, but is not limited thereto, and the filter rod 3 may be configured as a plurality of segments. For example, the filter rod 3 may include a first segment configured to cool aerosol and a second segment configured to filter a certain component included in the aerosol. In addition, the filter rod 3 may further include at least one segment configured to perform other functions.

The cigarette 1 may be packaged via at least one wrapper 4. The wrapper 4 may have at least one hole through which external air may be introduced or internal air may be discharged. For example, the cigarette 1 may be packaged via one wrapper 4. As another example, the cigarette 1 may be doubly packaged via at least two wrappers 4. In detail, the tobacco rod 2 may be packaged via a first wrapper, and the filter rod 3 may be packaged via a second wrapper. The tobacco rod 2 and the filter rod 3, which are respectively packaged via wrappers, may be coupled to each other, and the cigarette 1 may be entirely packaged via a third wrapper.

The tobacco rod 2 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. The tobacco rod 2 may include other additives, such as flavors, a wetting agent, and/or organic acid. The tobacco rod 2 may include a flavored liquid, such as menthol or a moisturizer, which is injected to the tobacco rod 2.

The tobacco rod 2 may be manufactured in various methods. For example, the tobacco rod 2 may be formed as a sheet or a strand. Alternatively, the tobacco rod 2 may be formed as a pipe tobacco, which is formed of tiny bits cut from a tobacco sheet.

Optionally, the tobacco rod 2 may be surrounded by a heat conductive material. For example, the heat conductive material may be, but is not limited to, a metal foil such as aluminum foil. In addition, the heat conductive material surrounding the tobacco rod 2 may function as a susceptor heated by an induction heater. Although not illustrated in FIG. 1, the tobacco rod 2 may further include an additional susceptor, in addition to the heat conductive material surrounding the tobacco rod 2.

The filter rod 3 may include at least one cellulose acetate filter. The filter rod 3 may be manufactured in various shapes. For example, the filter rod 3 may include a cylinder-type rod or a tube-type rod having a hollow inside. Alternatively, the filter rod 3 may include a recess-type rod having a cavity therein. When the filter rod 3 includes a plurality of segments, the plurality of segments may be manufactured in different shapes from each other.

The filter rod 3 may be formed to generate flavors in the filter rod 3. For example, a flavoring liquid may be injected onto the filter rod 3, or an additional fiber coated with a flavoring liquid may be inserted into the filter rod 3.

When the filter rod 3 includes a segment configured to cool the aerosol, the cooling segment may include a polymer material or a biodegradable polymer material. For example, the cooling segment may include pure polylactic acid alone. Alternatively, the cooling segment may include a cellulose acetate filter having a plurality of holes. However, the cooling segment is not limited thereto, and the cooling segment may include a structure and a material cooling the aerosol.

The filter rod 3 may include at least one capsule 5. The at least one capsule 5 may generate a flavor or aerosol. For example, the at least one capsule 5 may have a structure in which a liquid containing a flavoring material is wrapped with a film. The at least one capsule 5 may have a spherical or cylindrical shape, but is not limited thereto.

The at least one capsule 5 may include various capsules in which a plurality of materials form a plurality of layers. The various capsules may include at least one shell of at least one film material and at least one core of at least one interior material. For example, the various capsules may include a triple capsule including two film materials and one interior material. Detailed descriptions of the triple capsule will be described below with reference to FIG. 5.

Figure 5:
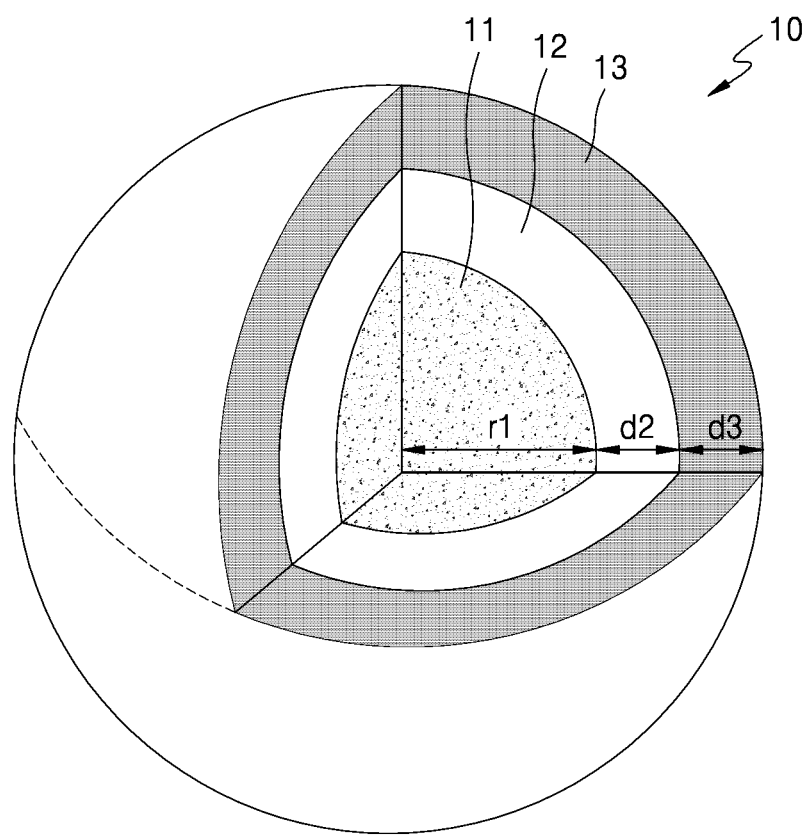
FIG. 5 is a diagram illustrating an embodiment of a structure of a triple capsule.

FIG. 5 is a diagram illustrating an embodiment of a structure of a triple capsule.

Referring to FIG. 5, a triple capsule 10 including an interior material 11, an intermediate film material 12, and an exterior film material 13. The triple capsule 10 is illustrated to have a spherical shape, but is not limited thereto, and the cross-section of the triple capsule 10 may include a locally elliptical shape or a partially deformed circular shape.

The triple capsule 10 may include the interior material 11, the intermediate film material 12, and the exterior film material 13. For example, in the triple capsule 10, the interior material 11 may be arranged in the innermost portion of the triple capsule 10 and form a core, the intermediate film material 12 may be arranged between the interior material 11 and the exterior film material 13 and surround the interior material 11, and the exterior film material 13 may be arranged on the outermost portion of the triple capsule 10 and surround the intermediate film material 12 surrounding the interior material 11.

The triple capsule 10 may have various sizes. The diameters or thicknesses of the interior material 11, the intermediate film material 12, and the exterior film material 13 included in the triple capsule 10 may be changed according to the intention of a designer. The standard of the triple capsule 10 may correspond to the standard of an outlet of a triple nozzle 122 illustrated in FIG. 5 to be described below. Because a triple molding body 14 may be discharged in a size corresponding to the standard of the triple nozzle 122, the triple capsule formed from the triple molding body may also have a diameter corresponding to the diameter of the outlet of the triple nozzle 122.

For example, the diameter of the interior material 11 may be 2.5 mm or more and 6.0 mm or less. Alternatively, the diameter of the interior material 11 may be 3.0 mm or more and 5.0 mm or less. Alternatively, the diameter of the interior material 11 may be 4.3 mm or more and 4.7 mm or less. Accordingly, a radius r1 of the interior material 11 may be 1.25 mm or more and 3.0 mm or less, 1.5 mm or more and 2.5 mm or less, or 2.15 mm or more and 2.35 mm or less.

For example, a thickness d2 of the intermediate film material 12 may be 0.1 mm or more and 1.0 mm or less. Alternatively, the thickness d2 of the intermediate film material 12 may be 0.3 mm or more and 0.7 mm or less. A thickness d3 of the exterior film material 13 may be 0.3 mm or more and 1.5 mm or less. Alternatively, the thickness d3 of the exterior film material 13 may be 0.4 mm or more and 0.9 mm or less.

The triple capsule 10 may be needed to be manufactured in a size acceptable to the filter rod 3 of the cigarette 1. The total diameter of the triple capsule 10 may be needed to be 11 mm or less to be accommodated in the filter rod 3. Preferably, the total diameter of the triple capsule 10 may be needed to be 6 mm or less.

When the size of the triple capsule 10 is excessively large or small, the efficiency in which the triple capsule 10 is formed from the triple molding body 14 may be reduced. Herein, the triple molding body 14 will be described below with reference to FIG. 3. In addition, the triple capsule 10 may be needed to have an appropriate size such that the triple capsule 10 may function smoothly.

As an embodiment of a function of the triple capsule 10, the triple capsule 10 may not leak without being crushed by a user, and aerosol generated from the cigarette 1 may be flavored by the interior material 11 after being crushed. In addition, to exhibit the function of the triple capsule 10, the strength at which the triple capsule 10 is crushed may be needed to be within an appropriate range, and the triple capsule 10 may be needed not to be deformed by a high temperature of aerosol.

The size of the interior material 11 may directly affect the total size of the triple capsule 10. When the diameter of the interior material 11 is excessively small, an area in which the triple capsule 10 is subjected to pressure inside the filter rod 3 of the cigarette 1 is reduced, and the triple capsule 10 is difficult to be crushed. When the diameter of the interior material 11 is excessively large, a content of the interior material 11 of the triple capsule 10 is excessive, and thus, the filter rod 3 may get wet or the wrapper 4 may stain after the triple capsule 10 is crushed.

The size of the intermediate film material 12 may be related to whether or not the intermediate film material 12 may be stably accommodated. When the thickness d2 of the intermediate film material 12 is excessively small, the intermediate film material 12 may leak. When the thickness d2 of the intermediate film material 12 is excessively large, the time required for the intermediate film material 12 to solidify increases during a molding operation, and thus, manufacturing efficiency may decrease.

The size of the exterior film material 13 may be related to the ease of crushing the triple capsule 10. The exterior film material 13 may include a polymer material having elasticity. When the thickness d3 of the exterior film material 13 is excessively large, an external force required for crushing the triple capsule 10 increases, making the crushing of the triple capsule 10 difficult. When the thickness d3 of the exterior film material 13 is excessively small, the triple capsule 10 may be crushed even with a small impact.

Accordingly, the diameters or the thicknesses of the interior material 11, the intermediate film material 12, and the exterior film material 13 may be needed to be set to appropriate values. When the triple capsule 10 is formed to have a diameter or thickness as in the above-stated embodiment, functions of each of the components included in the triple capsule 10 may be smoothly exhibited.

The diameters or thicknesses of the interior material 11, the intermediate film material 12, and the exterior film material 13 in the triple capsule 10 may refer to the diameter or thickness of the triple capsule 10 formed from the triple molding body 14. Alternatively, the triple capsule 10 may be slightly reduced in diameters or thicknesses as a drying operation is performed after being formed.

The interior material 11 may include a water-soluble material, the intermediate film material 12 may include a fat-soluble material, and the exterior film material 13 may include a water-soluble material. For example, the water-soluble material may refer to a hydrophilic material that is well soluble in a polar solvent such as water or ethanol, and the fat-soluble material may refer to a hydrophobic material that is soluble in a non-polar solvent such as benzene. The water-soluble material and the fat-soluble material may not be homogeneously mixed with each other, and when the water-soluble material and the fat-soluble material are mixed, layers may be formed by each of the water-soluble material and the fat-soluble material. For example, the interior material 11 may include a water-soluble polymer material, the intermediate film material 12 may include a fat-soluble wax, and the exterior film material 13 may include a water-soluble solvent and a water-soluble flavoring material.

When the triple capsule 10 is formed in a double-layer structure of the intermediate film material 12 and the exterior film material 13, and the intermediate film material 12 includes a fat-soluble material, a water-soluble material may be included in the interior material 11. Accordingly, a water-soluble flavoring material may be carried in the triple capsule 10, and flavors provided through the triple capsule 10 may vary. In addition, the water-soluble flavoring material may prevent undesirable effects on users.

Although the triple capsule 10 may carry the interior material 11, which is water-soluble, the intermediate film material 12, which is fat-soluble, may be arranged between the interior material 11 and the exterior film material 13 in the triple capsule 10. Therefore, the exterior film material 13 forming a surface of the triple capsule 10 may include a water-soluble material. In particular, when the exterior film material 13 includes a water-soluble polymer material, the exterior film material 13 may be elastic or flexible, and accordingly, an external force of a certain level or more may be needed to crush the triple capsule 10, and thus, the triple capsule 10 may be prevented from being crushed unintentionally.

The interior material 11 may include a water-soluble solvent and a water-soluble flavoring material. The water-soluble solvent may include at least one of water, propylene glycol, polyethylene glycol, diphosphoglycerate, and glycerin. The water-soluble flavoring material may include chemical materials such as L-menthol, vanillin, ethyl vanillin, maltol, ethyl maltol, acetic acid, propionic acid, or the like, extracts of natural raw materials such as coffee, vanilla, cocoa, raisins, licorice, or the like, and functional additives such as aspartame, saccharin, sucralose, acesulfame, neotame, thaumatin, stevioside, or the like.

The interior material 11 may be carried in the triple capsule 10 in various amount. The amount of the interior material 11 carried in the triple capsule 10 may be determined by the diameter of the interior material 11 and the density of the interior material 11 configuring the triple capsule 10. For example, the amount of the interior material 11 may be 8.0 mg or more and 115 mg or less. Alternatively, the amount of the interior material 11 may be 14 mg or more and 65 mg or less. However, the amount of the interior material 11 is not limited thereto and may be changed according to a change in the diameter or density of the interior material 11.

The intermediate film material 12 may include a fat-soluble wax. The intermediate film material 12 may include a hydrophobic beeswax separated from water or a hydrophilic material. For example, the intermediate film material 12 may include an animal-derived wax such as shellac wax, beeswax, or the like, a plant-derived wax such as carnauba wax, candelilla wax, castor wax, ouricury wax, or the like, a petroleum-based wax such as paraffin wax, microcrystalline wax, or the like, a resin such as rosin, lacquer, propolis, or the like, and processed oils derived from animals and plants such as soybean, rapeseed, canola, sunflower, peanut, coconut, palm, rice bran, or the like.

The intermediate film material 12 may be a structure between the exterior film material 13 and the interior material 11 and configured to separate the exterior film material 13 from the interior material 11, wherein the exterior film material 13 is water-soluble and the interior material 11 is water-soluble. Accordingly, the intermediate film material 12 being hardened and solidified between the exterior film material 13 and the interior material 11 may be a key operation in the molding operation of the triple capsule 10. The intermediate film material 12 may be needed to have a melting point within a certain range such that the intermediate film material 12 may solidify at an appropriate rate between the exterior film material 13 and the interior material 11. The melting point of the intermediate film material 12 may refer to a dropping point according to a standard of the American society for testing and materials (ASTM).

When the temperature, as the melting point of the intermediate film material 12, at which the intermediate film material 12 is solidified is excessively high, the intermediate film material 12 may be solidified before completely surrounding the interior material 11 in an operation of cooling the triple molding body 14. In addition, even when the temperature at which the intermediate film material 12 is solidified is excessively low, the time required for cooling may increase, thereby causing a molding failure of the triple capsule 10.

As an embodiment of the melting point required for the intermediate film material 12, the melting point of the intermediate film material 12 may be 38° C. or more and 95° C. or less. Alternatively, the melting point of the intermediate film material 12 may be may be 42° C. or more and 87° C. or less. Alternatively, the melting point of the intermediate film material 12 may be 52° C. or more and 72° C. or less. As the melting point of the intermediate film material 12 is set not to be excessively high or low through an adjustment of the composition ratio of the intermediate film material 12, the molding of the triple capsule 10 may be smoothly performed.

The intermediate film material 12 may have an appropriate range of hardness. In particular, when the triple capsule 10 is molded and the intermediate film material 12 is hardened, the intermediate film material 12 must have an appropriate range of hardness, such that the triple capsule 10 may be crushed according to the intention of a user. When the hardness of the intermediate film material 12 is excessively high, the crushing of the triple capsule 10 may be difficult. When the hardness of the intermediate film material 12 is excessively low, the triple capsule 10 may be unintentionally crushed. For example, according to needle penetration of petroleum waxes according to the international standard ASTM D1321, the hardness of the intermediate film material 12 may be 9 penetration units (PU) or more and 156 PU or less. Alternatively, the hardness of the intermediate film material 12 may be 15 PU or more and 96 PU or less.

The hardness of the intermediate film material 12 may be implemented only by waxes in the intermediate film material 12 such as the above-stated examples, or may be implemented by a mixture of waxes and oils such as medium chain triglyceride (MCT) or the like. As the mixing ratio of oils in the mixture increases, the hardness of the intermediate film material 12 may decrease, and the melting point of the intermediate film material 12 may be changed. Accordingly, a preferable crushing characteristic of the triple capsule 10 may be implemented through an adjustment of the mixing ratio of waxes and oils configuring the intermediate film material 12. For example, the mixing ratio of oils in the intermediate film material 12 may be 1% or more and 80% or less, based on the total weight of the intermediate film material 12.

The exterior film material 13 may include a water-soluble polymer material. The exterior film material 13 is a structure forming the outermost portion of the triple capsule 10, and may have a characteristic related to the crushing of the triple capsule 10. The exterior film material 13 may include an elastic or flexible material to prevent the triple capsule 10 from being crushed unintentionally.

For example, the exterior film material 13 may include at least one of water-soluble hydrocolloids such as gelatin, agar, carrageenan, alginic acid, pectin, or the like, gums such as gellan gum or the like, starches such as potato starch, corn starch, or the like, and starch derivatives such as dextrin, naltodextrin, cyclodextrix, or the like. In addition, the exterior film material 13 may also include a cellulose derivative such as hydroxypropyl methylcellulose (HPMC), hydroxypropyl cellulose (HPC), methyl cellulose (MC), carboxymethyl cellulose (CMC), or the like, polyvinyl alcohol, polyol, or the like.

The crushing strength indicating the strength for crushing the triple capsule 10 may be determined by the physical properties of the interior material 11, the intermediate film material 12, and the exterior film material 13. The crushing strength of the triple capsule 10 may be set to a rather high range by considering that the interior material 11 may have a relatively large diameter and the intermediate film material 12 is further included in addition to the exterior film material 13. In addition, due to the intermediate film material 12 implemented in an appropriate hardness and the elasticity of the exterior film material 13 implemented by a water-soluble polymer, the triple capsule 10 may be stored and inputted in the filter rod 3 even when the strength to crush the triple capsule 10 is somewhat low. For example, the crushing strength of the triple capsule 10 may be 0.3 kgf or more and 3.5 kgf or less. Alternatively, the crushing strength of the triple capsule 10 may be 0.5 kgf or more and 3.0 kgf or less.

Figure 2:
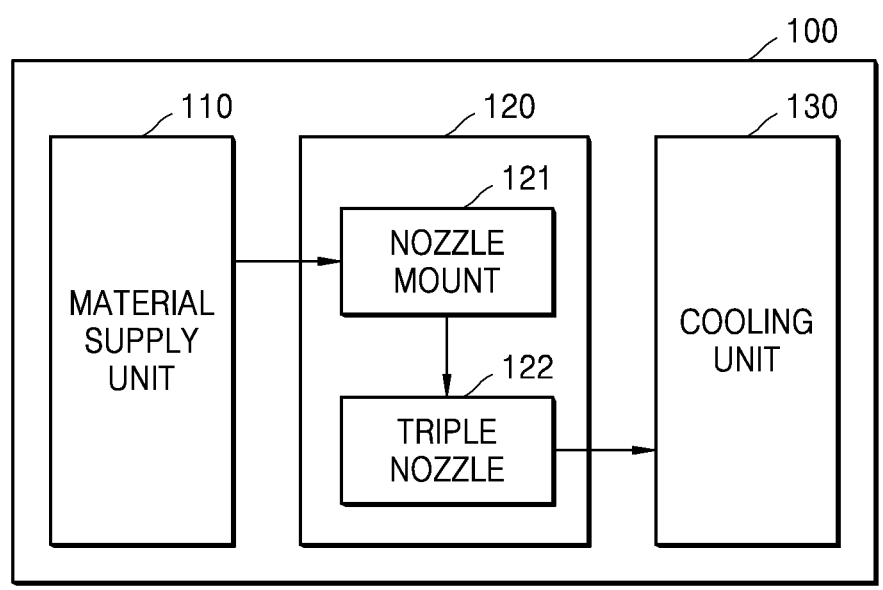
FIG. 2 is a structural diagram illustrating an embodiment of an apparatus for manufacturing the triple capsule.

FIG. 2 is a structural diagram illustrating an embodiment of an apparatus 100 for manufacturing the triple capsule 10.

Referring to FIG. 2, the apparatus 100 for manufacturing the triple capsule 10 may include a material supply unit 110, a molding unit 120, and a cooling unit 130. However, the present disclosure is not limited thereto. In addition to the components shown in FIG. 2, other general-purpose components may be further included in the apparatus 100. The triple capsule 10 manufactured by the apparatus 100 may be the triple capsule 10 described above with reference to FIG. 5.

The material supply unit 110 may supply the interior material 11, the intermediate film material 12, and the exterior film material 13. The material supply unit 110 may supply, to the molding unit 120, the interior material 11, the intermediate film material 12, and the exterior film material 13 included in the triple capsule 10.

The material supply unit 110 may include a storage unit, a connection unit, and a transfer unit to supply the interior material 11, the intermediate film material 12, and the exterior film material 13 to the molding unit 120. The material supply unit 110 may include a unit configured to store the interior material 11, the intermediate film material 12, and the exterior film material 13, a unit configured to connect the material supply unit 110 to the molding unit 120, and a unit configured to transfer the interior material 11, the intermediate film material 12, and the exterior film material 13 to the molding unit 120.

Each of the storage unit, the connection unit, and the transfer unit of the material supply unit 110 may be provided in the material supply unit 110 in a single number, but each of the storage unit, the connection unit, and the transfer unit may be included in the material supply unit 110 in plural corresponding to the interior material 11, the intermediate film material 12, and the exterior film material 13. Detailed descriptions of the material supply unit 110 will be described below with reference to FIG. 6.

The molding unit 120 may perform coextrusion on the interior material 11, the intermediate film material 12, and the exterior film material 13. The triple molding body 14 including the interior material 11, the intermediate film material 12, and the exterior film material 13 may be discharged from the molding unit 120 by the coextrusion on the interior material 11, the intermediate film material 12, and the exterior film material 13.

Coextrusion may refer to an operation of simultaneously performing extrusion on a plurality of materials to form a corporate body including the plurality of materials. In the apparatus 100, the interior material 11, the intermediate film material 12, and the exterior film material 13 may be coextruded by the molding unit 120, and accordingly, the triple molding body 14 including the interior material 11, the intermediate film material 12, and the exterior film material 13 may be produced from the molding unit 120.

The triple molding body 14 may refer to a mixture in which the interior material 11, the intermediate film material 12, and the exterior film material 13 are combined. The triple molding body 14 may be an intermediate material in an operation in which the interior material 11, the intermediate film material 12, and the exterior film material 13 are formed into the triple capsule 10. When the triple molding body 14 is cooled by the cooling unit 130, the triple capsule 10 may be formed.

The molding unit 120 may include a nozzle mount 121 receiving the interior material 11, the intermediate film material 12, and the exterior film material 13, and a triple nozzle 122 in which a first nozzle 123 discharging the interior material 11, a second nozzle 124 discharging the intermediate film material 12, and a third nozzle 125 discharging the exterior film material 13 are arranged concentrically. Detailed descriptions of components configuring the molding unit 120 will be described below with reference to FIG. 3.

The cooling unit 130 may form the triple capsule 10 by circulating a coolant to cool the triple molding body 14. The coolant may be circulated, by the cooling unit 130, through a path including the molding unit 120. Accordingly, the triple molding body 14 may be, immediately after being discharged from the molding unit 120, circulated according to the flow of the coolant, and in this operation, the triple molding body 14 may be cooled and the triple capsule 10 may be formed.

The cooling unit 130 may include a storage unit, a connection unit, and a transfer unit to circulate the coolant. The cooling unit 130 may include a storage unit configured to store the coolant, the connection unit configured to form a circulation path between the storage unit and the molding unit 120, and the transfer unit configured to circulate the coolant along the circulation path. Detailed descriptions of the cooling unit 130 will be described below with reference to FIG. 6.

Figure 3:
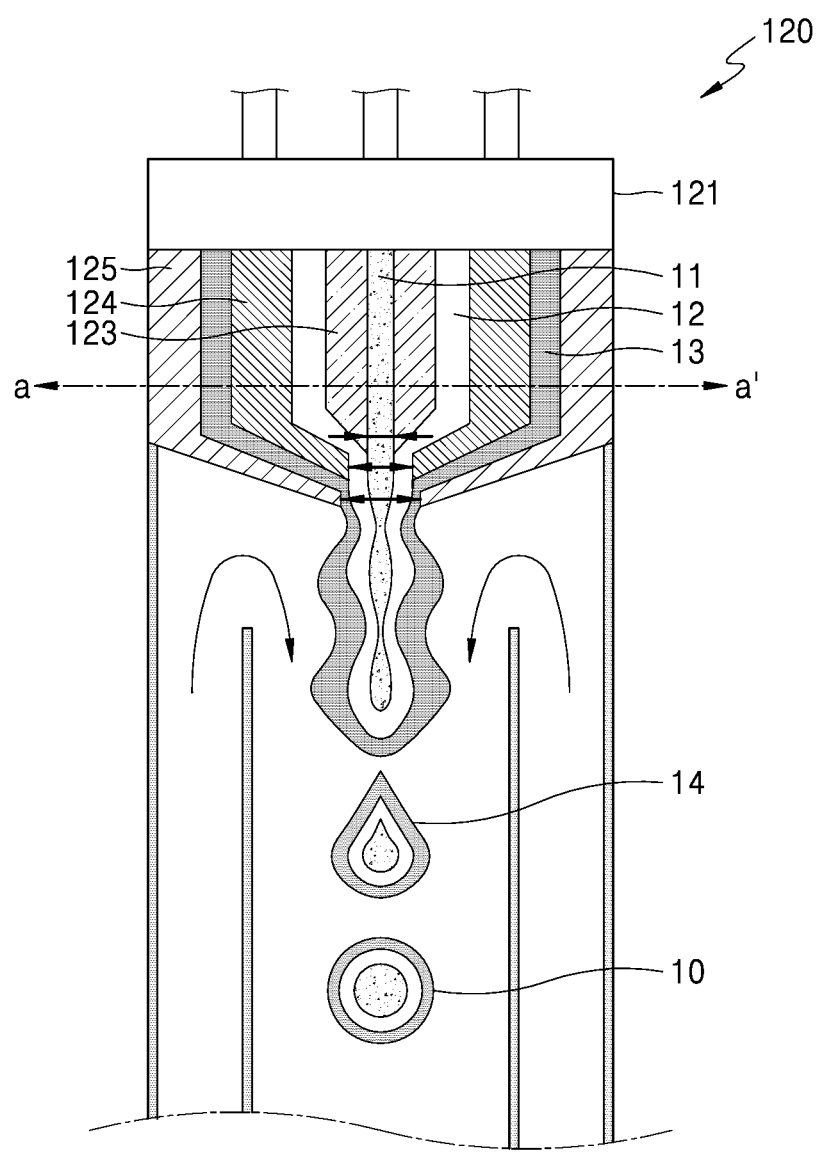
FIG. 3 is a diagram illustrating an embodiment of a structure of the molding unit 120 performing coextrusion.

FIG. 3 is a diagram illustrating an embodiment of a structure of the molding unit 120 performing coextrusion.

Referring to FIG. 3, the molding unit 120 may include the nozzle mount 121 and the triple nozzle 122. According to necessity, other general-purpose components may be further included in the molding unit 120, in addition to the nozzle mount 121 and the triple nozzle 122.

The nozzle mount 121 may receive, from the material supply unit 110, the interior material 11, the intermediate film material 12, and the exterior film material 13. The connection unit of the material supply unit 110 may be connected to the nozzle mount 121, and the nozzle mount 121 may accommodate the interior material 11, the intermediate film material 12, and the exterior film material 13 transferred by the transfer unit of the material supply unit 110.

The nozzle mount 121 may be bonded to the triple nozzle 122 to form the molding unit 120. The nozzle mount 121 may transfer the interior material 11, the intermediate film material 12, and the exterior film material 13, which are to be transferred to the triple nozzle 122. The nozzle mount 121 may be located higher than the triple nozzle 122 so as to more smoothly supply the interior material 11, the intermediate film material 12, and the exterior film material 13 to the triple nozzle 122, but is not limited thereto.

The nozzle mount 121 may have a cylindrical shape. When the nozzle mount 121 has a cylindrical shape, the interior material 11, the intermediate film material 12, and the exterior film material 13 may be transferred to the triple nozzle 122 that contacts through a bottom surface of the nozzle mount 121. However, in addition to the cylindrical shape, the nozzle mount 121 may have other shapes that may transfer the interior material 11, the intermediate film material 12, and the exterior film material 13 between the material supply unit 110 and the triple nozzle 122.

The triple nozzle 122 may have a shape in which the first nozzle 123 discharging the interior material 11, the second nozzle 124 discharging the intermediate film material 12, and the third nozzle 125 discharging the exterior film material 13 are arranged concentrically. The first nozzle 123, the second nozzle 124, and the third nozzle 125 may include a nozzle structure configured to eject a fluid to the outside. The triple nozzle 122 may discharge materials transferred from the material supply unit 110 and the nozzle mount 121 to the cooling unit 130 through an outlet having a small cross-sectional area.

The shape in which the first nozzle 123, the second nozzle 124, and the third nozzle 125 are arranged concentrically may mean that a position at which the interior material 11 is discharged from the first nozzle 123, a position at which the intermediate film material 12 is discharged from the second nozzle 124, and a position at which the exterior film material 13 is discharged from the third nozzle 125 are coincident. Alternatively, as shown in FIG. 3, the shape in which the first nozzle 123, the second nozzle 124, and the third nozzle 125 are arranged concentrically may mean that outlets from which the interior material 11, the intermediate film material 12, and the exterior film material 13 are discharged are arranged in a direction perpendicular to the ground surface.

The outlet of the first nozzle 123, the outlet of the second nozzle 124, and the outlet of the third nozzle 125 may have a circular cross-section. As the cross-sections of the outlets of the first nozzle 123, the second nozzle 124, and the third nozzle 125 are formed in a circular shape, the cross-section of the triple molding body 14 discharged from the third nozzle 125 may be circular. Accordingly, the third nozzle 125 may have a spherical shape. However, the present disclosure is not limited to the outlets having a circular cross-section, and the cross-sections of the outlets of the triple nozzle 122 may have a shape corresponding to various shapes of the triple molding body 14 and the triple capsule 10.

The outlets of the first nozzle 123, the second nozzle 124, and the third nozzle 125 may have different diameters from each other. For example, the outlet diameter of the second nozzle 124 discharging the intermediate film material 12 may be greater than the outlet diameter of the first nozzle 123 discharging the interior material 11, and the outlet diameter of the third nozzle 125 discharging the exterior film material 13 may be greater than the outlet diameter of the second nozzle 124 discharging the intermediate film material 12. Accordingly, a structure of the triple capsule 10 in which the exterior film material 13 again surrounds the intermediate film material 12 surrounding the interior material 11 may be implemented. However, when the structure of the triple capsule 10 is changed, the structure of the triple nozzle 122 may also be changed.

The standard of the triple nozzle 122 may be set to implement the standard of the triple capsule 10. For example, the outlet diameters of the first nozzle 123, the second nozzle 124, and the third nozzle 125 may be set to numerical values that may implement the standard of diameters of the interior material 11, the intermediate film material 12, and the exterior film material 13 forming the triple capsule 10. For example, the outlet diameter of the first nozzle 123 may be 1.0 mm or more and 3.0 mm or less, the outlet diameter of the second nozzle 124 may be greater than the outlet diameter of the first nozzle 123 by 0.5 mm or more and 2.5 mm or less, and the outlet diameter of the third nozzle 125 may be greater than the outlet diameter of the second nozzle 124 by 1.0 mm or more and 3.0 mm or less. However, when the design of the size of the triple capsule 10 is changed, the size of the triple nozzle 122 may also be changed to correspond thereto.

As described above, the interior material 11 may be a water-soluble material, the intermediate film material 12 may be a fat-soluble material, and the exterior film material 13 may be a water-soluble material. The coolant circulating through the cooling unit 130 may be a fat-soluble material. According to such physical properties, the interior material 11, the intermediate film material 12, and the exterior film material 13 inside the triple molding body 14 discharged from the triple nozzle 122 may form layers that do not mix together with the coolant. As the coolant circulates, the triple molding body 14 may be cooled while moving along the circulation path together with the coolant in a layered state, and in this operation, the intermediate film material 12 and the exterior film material 13 may form a curved surface by the attraction between water-soluble materials and the attraction between fat-soluble materials, and the triple capsule 10 carrying the interior material 11 may be formed.

In the operation in which the triple molding body 14 circulates along the coolant in the cooling unit 130, the outlets of the triple nozzle 122 may be needed to have appropriate diameters to stably form the triple capsule 10. When the outlets of the triple nozzle 122 have an excessively large diameter, the time required for the intermediate film material 12 and the exterior film material 13 to be closed, cooled, and stabilized increases, thereby reducing the yield of the triple capsule 10. When the outlets of the triple nozzle 122 have an excessively small diameter, the layers formed by the triple molding body 14 in the coolant may not form a thickness of a certain level or more, and the triple molding body 14 may be physically scattered by the circulation flow of the coolant.

Accordingly, the triple capsule 10 may be stably formed in the cooling unit 130 when the outlets of the triple nozzle 122 are formed with appropriate diameters. As described above, only when the outlet diameter of the first nozzle 123 is 1.0 mm or more and 3.0 mm or less, the outlet diameter of the second nozzle 124 is 1.5 mm or more and 5.5 mm or less, and the outlet diameter of the third nozzle 125 is 2.5 mm or more and 8.5 mm or less, the triple molding body 14 may be effectively separated into respective layers of the interior material 11, the intermediate film material 12, and the exterior film material 13, and thus, the yield of the triple capsule 10 may be increased.

Figure 4:
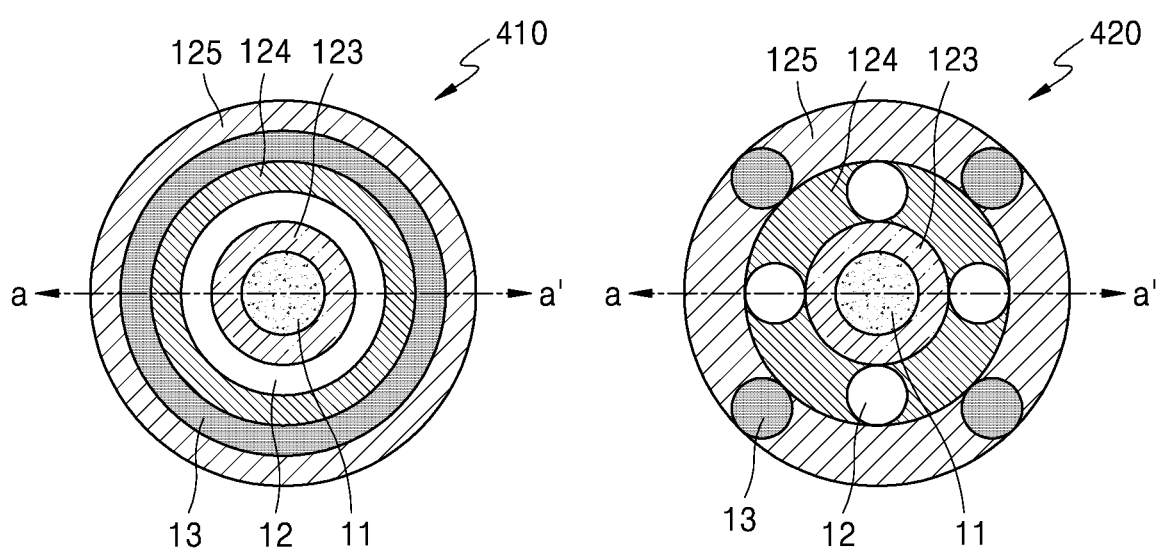
FIG. 4 is a diagram illustrating an embodiment of a structure of a molding unit performing coextrusion.

FIG. 4 is a diagram illustrating embodiments of a cross-sectional shape of the molding unit performing coextrusion.

Referring to FIG. 4, a cross-section 410 and a cross-section 420 cut parallel to the ground surface along line a-a' shown in FIG. 4 are shown. The first nozzle 123, the second nozzle 124, and the third nozzle 125 are shown in the cross-section 410 and the cross-section 420, and pathways through which the interior material 11, the intermediate film material 12, and the exterior film material 13 flow to the outlet of the third nozzle 125 are shown. However, the cross-section 410 and the cross-section 420 are only examples, and other structures may be applied in the triple nozzle 122 such that the interior material 11, the intermediate film material 12, and the exterior film material 13 are transferred to the outlets arranged concentrically.

In the case of the cross-section 410, the first nozzle 123, the second nozzle 124, and the third nozzle 125 may all have a circular shape. The interior material 11 may be transferred to the outlet of the triple nozzle 122 through the inside of the first nozzle 123, the intermediate film material 12 may be transferred to the outlet of the triple nozzle 122 through the space between the first nozzle 123 and the second nozzle 124, and the exterior film material 13 may be transferred to the outlet of the triple nozzle 122 through the space between the second nozzle 124 and the third nozzle 125.

In the case of the cross-section 420, although the first nozzle 123, the second nozzle 124, and third nozzle 125 may all have a circular shape, spaces between the first nozzle 123, the second nozzle 124, and the third nozzle 125 may not be formed, and spaces transferring the intermediate film material 12 and the exterior film material 13 may be respectively formed inside the second nozzle 124 and the third nozzle 125]. In the case of the cross-section 420, unlike in the cross-section 410, the first nozzle 123, the second nozzle 124, and the third nozzle 125 may be assembled without a gap, and thus, the structure of the triple nozzle 122 may be more stable.

The cross-section 410 and the cross-section 420 may be formed in different shapes at a position of line a-a', but may be implemented to have the same outlet structure as the cross-sectional area thereof becomes narrowly closer to the outlet from which the interior material 11, the intermediate film material 12, and the exterior film material 13 are discharged.

Figure 6:
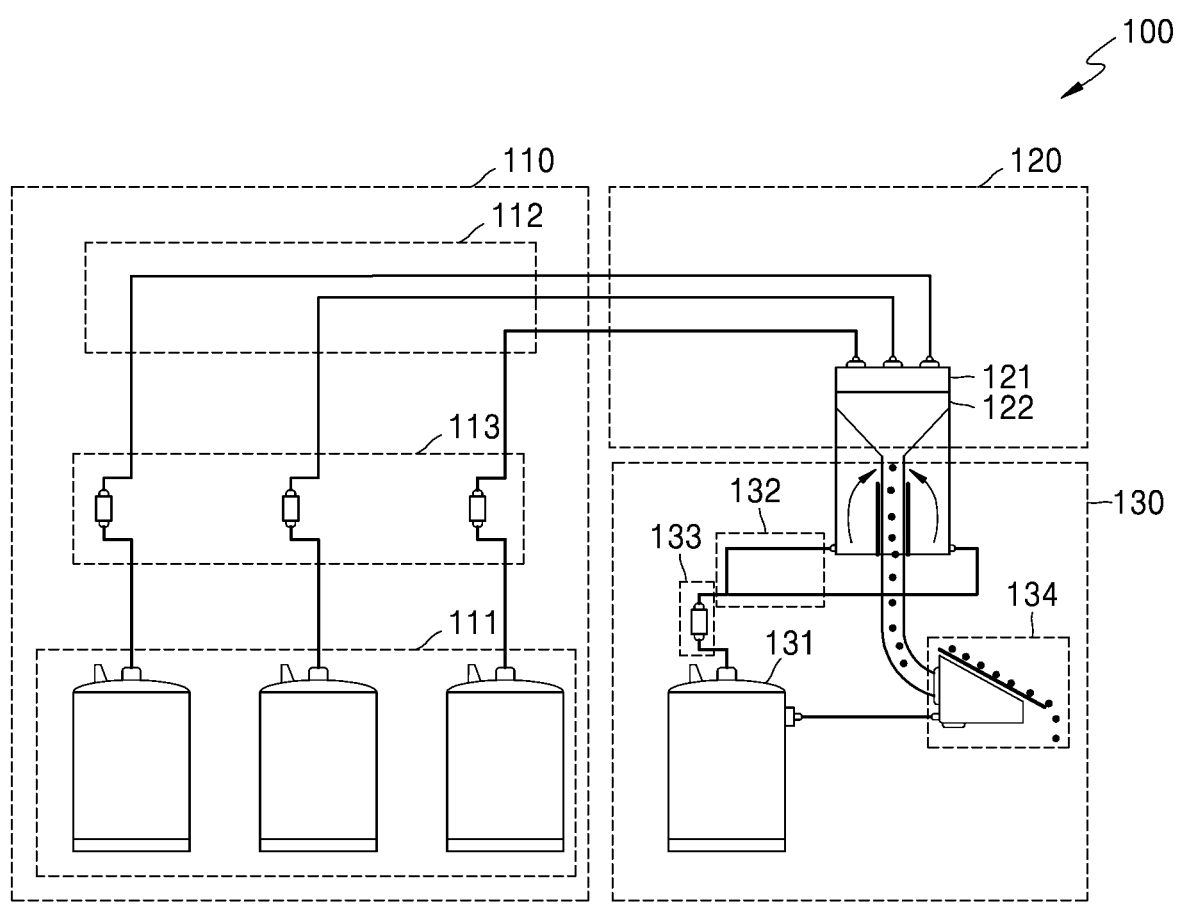
FIG. 6 is a diagram explaining an embodiment of an apparatus for manufacturing a triple capsule.

FIG. 6 is a diagram explaining an embodiment of the apparatus for manufacturing triple capsule.

Referring to FIG. 6, more detailed embodiments of components configuring the apparatus 100 for manufacturing the triple capsule 10 are illustrated. However, the present disclosure is not limited thereto. In addition to the components shown in FIG. 6, other general-purpose components may be further included in the apparatus 100.

The material supply unit 110 may include tanks 111 respectively storing the interior material 11, the intermediate film material 12, and the exterior film material 13, transfer lines 112 connecting each of the tanks 111 to the molding unit 120, and gear pumps 113 providing power respectively transferring the interior material 11, the intermediate film material 12, and the exterior film material 13 to the molding unit 120 through the transfer lines 112.

The tanks 111 may respectively store the interior material 11, the intermediate film material 12, and the exterior film material 13. The tanks 111 may include three tanks respectively storing the interior material 11, the intermediate film material 12, and the exterior film material 13, but are not limited thereto. The tanks 111 may be formed in a structure in which a single tank is divided into three zones to respectively store the interior material 11, the intermediate film material 12, and the exterior film material 13.

The transfer lines 112 may connect each of the tanks 111 to the molding unit 120. The transfer lines 112 may be a pathway through which the interior material 11, the intermediate film material 12, and the exterior film material 13 are transferred from the tanks 111 to the molding unit 120.

The gear pumps 113 may provide power transferring the interior material 11, the intermediate film material 12, and the exterior film material 13 to the molding unit 120 through the transfer lines 112. The gear pumps 113 may be a unit transferring a fluid having a high viscosity by rotation of two or more gears that engage. The interior material 11, the intermediate film material 12, and the exterior film material 13 may be transferred, by the gear pumps 113, from the tanks 111 to the molding unit 120 through the transfer lines 112.

Dampers may be further included in the transfer lines 112. The dampers may refer to a unit configured to adjust the flow rate by limiting the flow of the fluid. The dampers may be respectively arranged in each transfer lines 112, and the rate at which the interior material 11, the intermediate film material 12, and the exterior film material 13 are transferred may be adjusted by the gear pumps 113 and the dampers.

The cooling unit 130 may include a coolant tank 131 storing a coolant, a coolant circulation line 132 formed between the coolant tank 131 and the molding unit 120, and a coolant gear pump 133 providing power circulating a coolant through the coolant circulation line 132.

The coolant tank 131 may store a coolant. The coolant may be stored in the coolant tank 131 again after circulating along the coolant circulation line 132. The coolant tank 131 may further include an inlet receiving the coolant that is to be stored again after circulation.

The coolant may include a fat-soluble material. As the coolant includes a fat-soluble material, the triple molding body 14, in which the exterior film material 13, which is water-soluble, is arranged on the outermost portion of the triple molding body 14, may be cooled in the cooling unit 130 without being mixed with the coolant. For example, the coolant may be a medium chain triglyceride (MCT). However, the present disclosure is not limited thereto, and other materials, as a fat-soluble material, capable of cooling the triple molding body 14 may be used as the coolant.

The coolant circulation line 132 may be formed between the coolant tank 131 and the molding unit 120. The coolant circulation line 132 may include a portion configured to transfer the coolant from the coolant tank 131 to the molding unit 120 and a portion configured to return the coolant from the molding unit 120 to the coolant tank 131. The coolant may circulate between the coolant tank 131 and the molding unit 120 to cool the triple molding body 14 through the coolant circulation line 132.

The coolant gear pump 133 may provide power circulating the coolant through the coolant circulation line 132. The coolant gear pump 133 may be a unit transferring a fluid having a high viscosity by rotation of two or more gears that engage. The coolant may be circulated, by the coolant gear pump 133, between the coolant tank 131 and the molding unit 120 through the coolant circulation line 132. A damper configured to adjust the flow rate by limiting the flow of the coolant may be further included in the coolant circulation line 132.

The cooling unit 130 may further include a capsule separator 134 configured to separate the triple capsule 10 from the coolant. The capsule separator 134 may separate the triple capsule 10 circulating together with the coolant into a coolant to be returned to the coolant tank 131 and the triple capsule 10 after cooling has been completed.

The capsule separator 134 may include a sieve that the coolant passes through and the triple capsule 10 does not pass through. When the coolant and the triple capsule 10 reach the sieve, the coolant may pass through the sieve and be transferred to the coolant tank 131. The sieve may include a ramp structure having an inclined angle with respect to the ground surface. The triple capsule 10 may be separately collected by the ramp structure of the sieve.

The temperature of the interior material 11, the intermediate film material 12, the exterior film material 13, and the coolant respectively need to be maintained with a certain range, such that the triple molding body 14 is discharged from the molding unit 120 and the triple molding body 14 is cooled in the cooling unit 130 to form the triple capsule 10. When the temperature of the interior material 11, the intermediate film material 12, and the exterior film material 13 is excessively high or low, the triple molding body 14 may be difficult to be cooled at an appropriate speed, and thus, the triple capsule 10 may not be smoothly molded.

For example, the temperature at which the interior material 11 is supplied to the molding unit 120 may be 20° C. or more and 80° C. or less, the temperature at which the intermediate film material 12 is supplied to the molding unit 120 may be 20° C. or more and 150° C. or less, and the temperature at which the exterior film material 13 is supplied to the molding unit 120 may be 20° C. or more and 80° C. or less. However, this is only an example, and other temperature ranges may be set such that the triple molding body 14 is properly cooled.

The coolant may also be required to have a suitable temperature. As the triple molding body 14 is cooled by the coolant, the temperature of the coolant may be set to be lower than the temperature of the interior material 11, the intermediate film material 12, and the exterior film material 13. For example, the temperature of the coolant may be required to be maintained at 10° C. or more and 30° C. or less.

The temperature of the tanks 111 and the transfer lines 112 of the material supply unit 110 may be maintained within a certain range to adjust the temperature at which the interior material 11, the intermediate film material 12, and the exterior film material 13 are supplied to the molding unit 120. As described above, the tank storing the interior material 11 among the tanks 111 and the transfer line to which the interior material 11 is transferred among the transfer lines 112 may be maintained at a temperature of 20° C. or more and 80° C. or less, and the intermediate film material 12 and the exterior film material 13 may be applied the same.

The temperature of the coolant may increase in an operation of cooling the triple molding body 14 in the cooling unit 130. Accordingly, the temperature of the coolant tank 131 and the coolant circulation line 132 may be maintained at an appropriate temperature to maintain the temperature of the heated coolant at an appropriate temperature again. For example, the coolant having a raised temperature after cooling the triple molding body 14 may be cooled again in the coolant tank 131 to a temperature of 10° C. or more and 30° C. or less after being returned to the coolant tank 131.

The apparatus 100 may further include a washing unit (not shown) washing the coolant included in the triple capsule 10, a drying unit (not shown) drying the triple capsule 10 washed by the washing unit, and a moisture-proof treatment unit (not shown) performing moisture-proof treatment on the triple capsule 10 dried by the drying unit.

The washing unit may wash the coolant included in the triple capsule 10. The triple capsule 10 may be separated from the coolant in the capsule separator 134, but a portion of the coolant may be still included in the triple capsule 10 and remain on the surface of the triple capsule 10. The washing unit may remove the remaining coolant from the triple capsule 10. The washing unit may remove the coolant with an organic solvent such as acetone, ethyl acetate, ethanol, petroleum ether, or the like. Alternatively, the washing unit may remove the coolant through centrifugation.

The drying unit may dry the triple capsule 10 washed by the washing unit. The triple capsule 10 molded by cooling the triple molding body may be more stabilized through a drying treatment. The drying unit may be a rotary dryer drying the triple capsule 10, but other structures capable of drying the triple capsule 10 may be used in the drying unit.

The moisture-proof treatment unit may perform a moisture-proof treatment on the triple capsule 10 dried by the drying unit. The moisture-proof treatment may be performed to prevent the triple capsule 10 from including moisture again by an external environment after being dried by the drying unit. The moisture-proof treatment may be performed by a method of treating a hardening agent in the triple capsule 10, which is dried.

The hardening agent may include a solution of calcium ions such as calcium chloride, dicalcium phosphate, calcium sulfate, or the like, and a weakly acidic solution such as adipic acid, fumaric acid, glucosan, or the like having a pH in a range of 3 to 4. The method of treating the hardening agent may include coating or applying the hardening agent on the triple capsule 10, immersing the triple capsule 10 into a hardening agent solution, spraying the hardening agent solution on the triple capsule 10, or the like.

Figure 7:
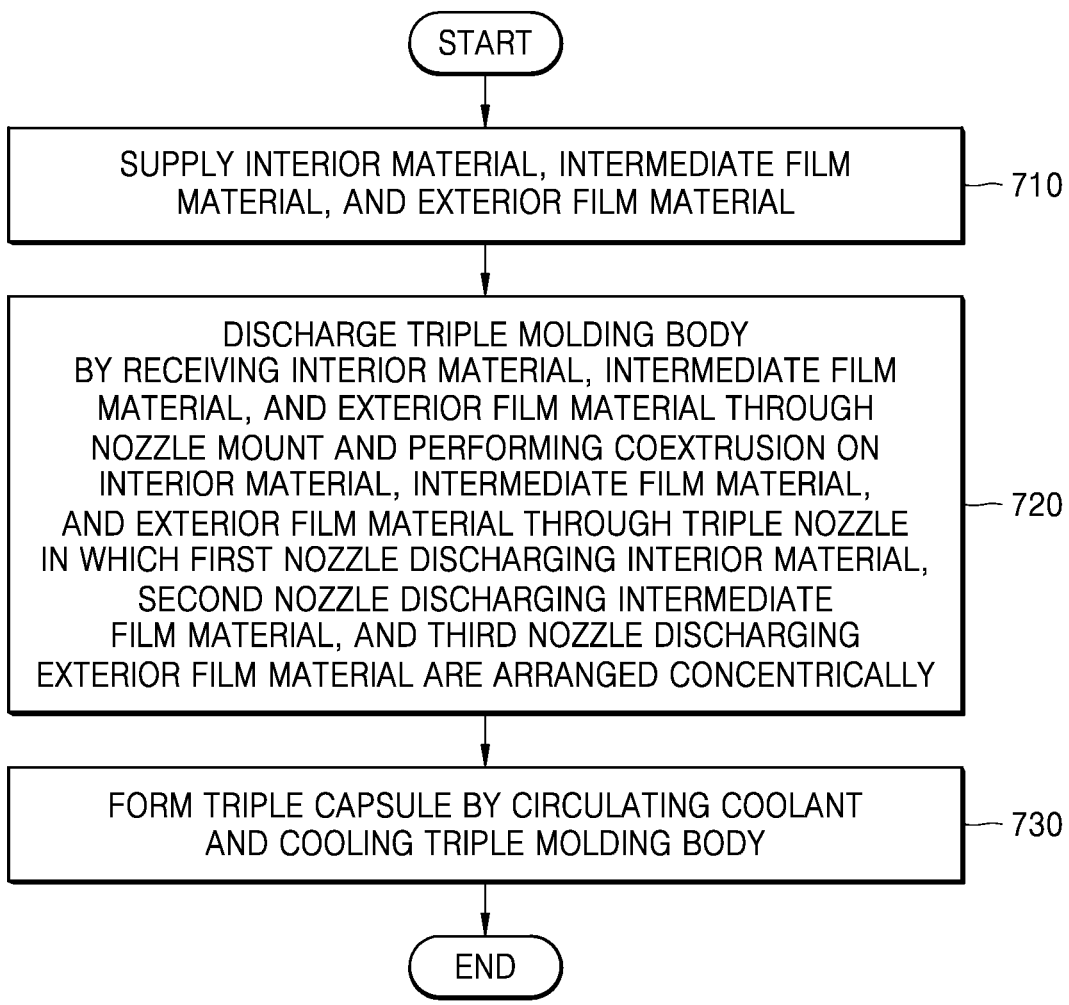
FIG. 7 is a flowchart illustrating an embodiment of a method of manufacturing a triple capsule.

FIG. 7 is a flowchart illustrating an embodiment of a method of manufacturing a triple capsule.

Referring to FIG. 7, a method of manufacturing the triple capsule may include operation 710 to operation 730. However, other general-purpose operations may be further included in the method of manufacturing the triple capsule, in addition to the operations illustrated in FIG. 7.

The method of manufacturing the triple capsule of FIG. 7 may include operations performed in a time series in the apparatus 100 for manufacturing the triple capsule in FIGS. 3 to 6. Accordingly, descriptions described above with respect to the apparatus 100 for manufacturing the triple capsule in FIGS. 3 to 6 may also be applied in the method of manufacturing the triple capsule of FIG. 7 even though omitted below.

In operation 710, the apparatus 100 may supply the interior material 11, the intermediate film material 12, and the exterior film material 13.

In operation 720, the apparatus 100 may discharge the triple molding body 14 by receiving the interior material 11, the intermediate film material 12, and the exterior film material 13 through the nozzle mount 121 and performing coextrusion on the interior material 11, the intermediate film material 12, and the exterior film material 13 through the triple nozzle 122 in which the first nozzle 123 discharging the interior material 11, the second nozzle 124 discharging the intermediate film material 12, and the third nozzle 125 discharging the exterior film material 13 are arranged concentrically.

In operation 730, the apparatus may form the triple capsule 10 by circulating the coolant and cooling the triple molding body 14.

Although the embodiments have been described in detail above, the scope of the present disclosure is not limited thereto, and those of ordinary skill in the art may understand that various modifications and improvements using the basic concept of the present disclosure as defined in the following claims are included in the scope of the present disclosure.

The invention claimed is:

1. A method of manufacturing a triple capsule, the method comprising:
   supplying an interior material, an intermediate film material, and an exterior film material;
   discharging a triple molding body by receiving the interior material, the intermediate film material, and the exterior film material through a nozzle mount and performing coextrusion on the interior material, the intermediate film material, and the exterior film material through a triple nozzle in which a first nozzle discharging the interior material, a second nozzle discharging the intermediate film material, and a third nozzle discharging the exterior film material are arranged concentrically; and
   forming the triple capsule by circulating a coolant and cooling the triple molding body,
   wherein the intermediate film material comprises waxes and oils, a mixing ratio of the oils in the intermediate film material is 1% or more and 80% or less based on a total weight of the intermediate film material, such that a crushing strength of the triple capsule is 0.3 kgf or more and 3.5 kgf or less by adjusting a hardness of the intermediate film material from 9 penetration unit (PU) or more and 156 PU or less through the mixing ratio of the oils, and
   wherein the first nozzle, the second nozzle, and the third nozzle do not have a gap between them.

2. The method of claim 1, wherein
   an outlet diameter of the first nozzle is 1.0 mm or more and 3.0 mm or less,
   an outlet diameter of the second nozzle is greater than the outlet diameter of the first nozzle by 0.5 mm or more and 2.5 mm or less, and
   an outlet diameter of the third nozzle is greater than the outlet diameter of the second nozzle by 1.0 mm or more and 3.0 mm or less.

3. The method of claim 1, wherein a content of the interior material is 8 mg or more and 115 mg or less.

4. The method of claim 1, wherein a melting point of the intermediate film material is 38° C. or more and 95° C. or less.

5. The method of claim 1, wherein the intermediate film material is formed inside the second nozzle and the exterior film material is formed inside the third nozzle.

6. The method of claim 1, wherein the intermediate film material is discharged through a plurality of spaces inside the second nozzle that wraps an outer circumference of the first nozzle without a gap, and the exterior film material is discharged through a plurality of spaces inside the third nozzle that wraps an outer circumference of the second nozzle without a gap.

7. An apparatus for manufacturing a triple capsule, the apparatus comprising:
   a material supply unit configured to supply an interior material, an intermediate film material, and an exterior film material;
   a molding unit comprising a nozzle mount receiving the interior material, the intermediate film material, and the exterior film material and
   a triple nozzle in which a first nozzle discharging the interior material, a second nozzle discharging the intermediate film material, and a third nozzle discharging the exterior film material are arranged concentrically, and
   discharging a triple molding body by receiving the interior material, the intermediate film material, and the exterior film material through the nozzle mount and performing coextrusion on the interior material, the intermediate film material, and the exterior film material through the triple nozzle in which the first nozzle discharging the interior material, the second nozzle discharging the intermediate film material, and the third nozzle discharging the exterior film material are arranged concentrically; and
   a cooling unit forming the triple capsule by circulating a coolant and cooling the triple molding body,
   wherein the intermediate film material comprises waxes and oils, a mixing ratio of the oils in the intermediate film material is 1% or more and 80% or less based on a total weight of the intermediate film material, such that a crushing strength of the triple capsule is 0.3 kgf or more and 3.5 kgf or less by adjusting a hardness of the intermediate film material from 9 penetration unit (PU) or more and 156 PU or less through the mixing ratio of the oils, and
   wherein the first nozzle, the second nozzle, and the third nozzle do not have a gap between them.

8. The apparatus of claim 7, wherein
   an outlet diameter of the first nozzle is 1.0 mm or more and 3.0 mm or less,
   an outlet diameter of the second nozzle is greater than the outlet diameter of the first nozzle by 0.5 mm or more and 2.5 mm or less, and
   an outlet diameter of the third nozzle is greater than the outlet diameter of the second nozzle by 1.0 mm or more and 3.0 mm or less.

9. The apparatus of claim 7, wherein
   a temperature at which the interior material is supplied to the molding unit is 20° C. or more and 80° C. or less,
   a temperature at which the intermediate film material is supplied to the molding unit is 20° C. or more and 150° C. or less, and
   a temperature at which the exterior film material is supplied to the molding unit is 20° C. or more and 80° C. or less.

10. The apparatus of claim 7, wherein a melting point of the intermediate film material is 38° C. or more and 95° C. or less.

11. The apparatus of claim 7, wherein a hardness of the intermediate film material is 9 penetration unit (PU) or more and 156 PU or less, according to American society for testing and materials (ASTM) D1321.

* * * * *